United States Patent
Nordin et al.

(10) Patent No.: US 11,208,538 B2
(45) Date of Patent: Dec. 28, 2021

(54) THERMALLY EXPANDABLE MICROSPHERES PREPARED FROM BIO-BASED MONOMERS

(71) Applicant: NOURYON CHEMICALS INTERNATIONAL B.V., Arnhem (NL)

(72) Inventors: Ove Nordin, Kvissleby (SE); Anna Ekmarker, Ankarsvik (SE); Evelina Waltersson, Kvissleby (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 34 days.

(21) Appl. No.: 16/758,637

(22) PCT Filed: Nov. 20, 2018

(86) PCT No.: PCT/EP2018/081957
§ 371 (c)(1),
(2) Date: Apr. 23, 2020

(87) PCT Pub. No.: WO2019/101749
PCT Pub. Date: May 31, 2019

(65) Prior Publication Data
US 2020/0347197 A1    Nov. 5, 2020

(30) Foreign Application Priority Data
Nov. 21, 2017  (EP) .................................... 17202814

(51) Int. Cl.
| C08J 9/16 | (2006.01) |
| C08J 9/232 | (2006.01) |
| C08J 9/00 | (2006.01) |
| C08J 9/14 | (2006.01) |
| C08J 9/20 | (2006.01) |

(52) U.S. Cl.
CPC ............... *C08J 9/232* (2013.01); *C08J 9/009* (2013.01); *C08J 9/0066* (2013.01); *C08J 9/141* (2013.01); *C08J 9/20* (2013.01); *C08J 2203/14* (2013.01); *C08J 2203/22* (2013.01); *C08J 2335/02* (2013.01)

(58) Field of Classification Search
CPC . C08J 9/232; C08J 9/0066; C08J 9/009; C08J 9/141; C08J 9/20; C08J 2203/14; C08J 2203/22; C08J 2335/02; B01J 13/14
See application file for complete search history.

(56) References Cited

U.S. PATENT DOCUMENTS

| 3,044,941 A | 7/1962 | Nubel et al. |
| 3,259,595 A | 7/1966 | Wright et al. |
| 3,615,972 A | 10/1971 | Morehouse, Jr. et al. |
| 3,657,162 A | 4/1972 | Finestone et al. |
| 3,740,359 A | 6/1973 | Garner |
| 3,945,956 A | 3/1976 | Garner |
| 4,287,308 A | 9/1981 | Nakayama et al. |
| 5,536,756 A | 7/1996 | Kida et al. |
| 6,509,384 B2 | 1/2003 | Kron et al. |
| 7,285,576 B2 | 10/2007 | Hyde et al. |
| 7,338,997 B2 | 3/2008 | Kuwahara et al. |
| 7,981,444 B2 | 7/2011 | Tomalia et al. |
| 8,330,936 B2 | 12/2012 | Streefkerk et al. |
| 8,808,597 B2 | 8/2014 | Way et al. |
| 9,102,805 B2 | 8/2015 | Kawaguchi et al. |
| 9,109,096 B2 | 8/2015 | Kawaguchi et al. |
| 9,126,178 B2 | 9/2015 | Kita et al. |
| 10,093,783 B2 | 10/2018 | Tokumura |

(Continued)

FOREIGN PATENT DOCUMENTS

| CN | 102633936 A | 8/2012 |
| CN | 104005239 A | 8/2014 |

(Continued)

OTHER PUBLICATIONS

ISA EPO, European Extended Search Report issued in European Application No. 17202814.4, dated May 18, 2018.

(Continued)

*Primary Examiner* — Kara B Boyle
(74) *Attorney, Agent, or Firm* — Lorenz & Kopf, LLP

(57) ABSTRACT

The present disclosure provides thermally expandable microspheres at least partially prepared from bio-based monomers and a process of their manufacture. The microspheres include a thermoplastic polymer shell encapsulating a blowing agent. The thermoplastic polymer shell includes a copolymer of an itaconate dialkylester and at least one aliphatic or aromatic mono-ethylenically unsaturated comonomer. The itaconate dialkylester has the formula (1):

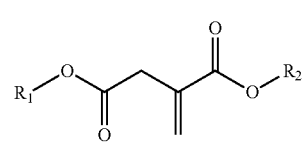

where each of $R_1$ and $R_2$, separately from one another, is an alkyl group having 1-4 carbon atoms, and the copolymer includes 0-50 wt. % of vinyl aromatic comonomers, based on the total weight of the comonomers. The present disclosure further provides expanded microspheres usable in a variety of applications.

13 Claims, No Drawings

(56) References Cited

U.S. PATENT DOCUMENTS

| | | |
|---|---|---|
| 2001/0051666 A1 | 12/2001 | Kron et al. |
| 2003/0130414 A1 | 7/2003 | Brandenburg et al. |
| 2006/0100447 A1 | 5/2006 | Manzer et al. |
| 2007/0122625 A1 | 5/2007 | Pickett et al. |
| 2009/0148698 A1 | 6/2009 | Kawaguchi et al. |
| 2012/0076843 A1 | 3/2012 | Jung et al. |
| 2012/0139143 A1 | 6/2012 | Way et al. |
| 2014/0296461 A1 | 10/2014 | Joo et al. |
| 2014/0377464 A1 | 12/2014 | Nabuurs et al. |
| 2016/0310924 A1 | 10/2016 | Nakatomi et al. |

FOREIGN PATENT DOCUMENTS

| | | | |
|---|---|---|---|
| CN | 107880204 A | 4/2018 | |
| CN | 108250372 A | 7/2018 | |
| EP | 0348372 A2 | 12/1989 | |
| EP | 0486080 A2 | 5/1992 | |
| EP | 2441814 B1 * | 8/2018 | ............ B01J 13/185 |
| GB | 1094315 A | 12/1967 | |
| JP | H02120385 A | 5/1990 | |
| JP | 2007533838 A | 11/2007 | |
| JP | 2011046805 A | 3/2011 | |
| JP | 5214678 B2 | 6/2013 | |
| JP | 2014019750 A | 2/2014 | |
| JP | 5596877 B1 | 9/2014 | |
| RU | 2560173 C2 | 8/2015 | |
| WO | 2004056549 A1 | 7/2004 | |
| WO | 2004072160 A1 | 8/2004 | |
| WO | 2006009643 A2 | 1/2006 | |
| WO | 2007091960 A1 | 8/2007 | |
| WO | 2016084612 A1 | 6/2016 | |
| WO | 2018011182 A1 | 1/2018 | |

OTHER PUBLICATIONS

ISA EPO, International Search Report issued in International Application No. PCT/EP2018/081957, dated Jan. 4, 2019.

Grishin, I.D., et al. "Radical Polymerization of Acrylonitrile under the Action of Catalytic Systems Based on Zero-Valent Copper," Russian Journal of Applied Chemistry, 2015, pp. 1153-1160, vol. 88, No. 8, Pleiades Publishing, Ltd.

Trumbo, D.L. "Copolymerization behavior of 2-vinyl-5-methyl furan," Polymer Bulletin 34, 1995, pp. 399-404, Springer-Verlag.

Derwent Abstract for JP60092367A, dated May 23, 1985.

Derwent Abstract KR2014077577A, dated Jun. 24, 2014.

* cited by examiner

THERMALLY EXPANDABLE MICROSPHERES PREPARED FROM BIO-BASED MONOMERS

CROSS-REFERENCE TO RELATED APPLICATIONS

This application is a U.S. National-Stage entry under 35 U.S.C. § 371 based on International Application No. PCT/EP2018/081957, filed Nov. 20, 2018, which was published under PCT Article 21(2) and which claims priority to European Application No. 17202814.4, filed Nov. 21, 2017, which are all hereby incorporated in their entirety by reference.

TECHNICAL FIELD

The present disclosure relates to thermally expandable microspheres at least partially prepared from bio-based monomers and to a process of their manufacture. The present disclosure further provides expanded microspheres prepared from the thermally expandable microspheres.

BACKGROUND

Thermally expandable microspheres are known in the art, as disclosed in, for example, U.S. Pat. No. 3,615,972 and WO 2007/091960. Thermally expandable microspheres comprise a shell of a thermoplastic resin and a blowing agent (propellant) encapsulated therein. Upon heating the thermoplastic shell softens and simultaneously the blowing agent volatilizes while being retained within the thermoplastic shell, which in turn causes an expansion of the thermally expandable thermoplastic microspheres to form expanded microspheres. Expandable microspheres are marketed in various forms, e.g. as dry free-flowing particles, as aqueous slurry or as a partially dewatered wet cake.

Expandable microspheres can be produced by polymerizing ethylenically unsaturated monomers in the presence of a blowing agent. Conventional monomers used to form the polymer for the thermoplastic shell are a mixture of vinyl containing monomers, such as, vinylidene chloride, acrylonitrile, methyl methacrylate, methyl acrylate, methacrylonitrile and methacrylic acid in various combinations. Conventional monomers are used as they impart thermoplastic properties to the thermoplastic shell ensuring that the thermally expandable thermoplastic microspheres expand satisfactorily when heated to form the expanded microspheres whilst retaining the blowing agent therein.

Conventional monomers are generally produced from petrochemicals which originate from fossil fuels. Therefore, there is a growing need in polymers produced at least partially from monomers obtained from renewable sources (bio-based monomers).

However, replacement of conventional monomers by bio-based monomers is not easy because the bio-based monomers need to meet the demands of the conventional monomers and be compatible with these to form a polymer. In order to make expandable microspheres from the polymers there are even more requirements. First, the polymer must have the right surface energy to get a core-shell particle in a suspension polymerization reaction so that the blowing agent is encapsulated. Second, the produced polymer must have good gas barrier properties to be able to retain the blowing agent. Finally, the polymer must have suitable viscoelastic properties above glass transition temperature Tg so that the shell can be stretched out during expansion.

SUMMARY

It has surprisingly been found that the above requirements are met when the polymer is a copolymer based on itaconate dialkyl esters, and that it is possible to obtain thermally expandable microspheres with good expansion properties from copolymers of itaconate dialkyl esters.

Accordingly, the present disclosure provides, in a first aspect, thermally expandable microspheres comprising a thermoplastic polymer shell encapsulating a blowing agent, wherein the thermoplastic polymer shell comprises a copolymer of an itaconate dialkylester and at least one aliphatic or aromatic mono-ethylenically unsaturated comonomer, wherein the itaconate dialkylester is according to formula (1):

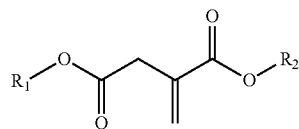

wherein each of $R_1$ and $R_2$, separately from one another, is an alkyl group preferably with 1-4 carbon atoms, and wherein the copolymer contains 0-50 wt. % of vinyl aromatic comonomers, based on the total weight of the comonomers.

In a further aspect, the present disclosure relates to a process for the manufacture of thermally expandable microspheres comprising aqueous suspension polymerization of ethylenically unsaturated monomer(s) using a free-radical initiator in the presence of a blowing agent, wherein at least one ethylenically unsaturated monomer is the itaconate dialkylester according to formula (1).

In a further aspect, the present disclosure relates to expanded microspheres obtained by thermal expansion of the microspheres of the present disclosure.

DETAILED DESCRIPTION

The thermoplastic polymer shell of the microspheres according to the present disclosure comprises a copolymer of an itaconate dialkylester and at least one aliphatic or aromatic mono-ethylenically unsaturated comonomer, wherein the itaconate dialkylester is according to formula (1):

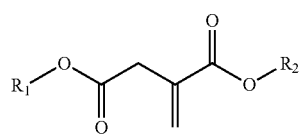

wherein each of $R_1$ and $R_2$, separately from one another, is an alkyl group preferably with 1-4 carbon atoms. Suitable alkyl groups include methyl, ethyl, n-propyl, isopropyl and butyl groups. Particularly, the itaconate dialkylester is preferably selected from the group consisting of dimethyl itaconate (DMI), diethyl itaconate (DEI), di(n-propyl) itaconate, diisopropyl itaconate, dibutyl itaconate (DBI).

According to the present disclosure, the copolymer in the thermoplastic polymer shell is a copolymer of the itaconate dialkylester and at least one aliphatic or aromatic mono-ethylenically unsaturated comonomers. Suitable mono-unsaturated comonomers are for example (meth)acrylates; vinyl esters; styrenes such as styrene and α-methylstyrene; nitrile-containing monomers; (meth)acrylamides; vinylidene halides, vinyl chloride, vinyl bromide and other halogenated vinyl compounds; vinyl ethers such as methyl vinyl ether, ethyl vinyl ether; N-substituted maleimides; dienes such as butadiene, isoprene and others; vinyl pyridine; and any combination thereof.

Particularly preferred comonomers are selected from the list consisting of unsaturated lactones, (meth)acrylonitrile, methyl (meth)acrylate, vinylidene chloride, methacrylic acid, methacrylamide or any combination thereof. Preferred unsaturated lactones have the following formula:

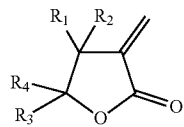

wherein each of $R_1$, $R_2$, $R_3$, $R_4$, separately from one another, is selected from the group consisting of H and an alkyl group preferably with 1-4 carbon atoms.

In preferred embodiments, $R_1$, $R_2$, $R_3$, and $R_4$ in the above formula are selected as follows:
$R_1$=H, $R_2$=H, $R_3$=CH$_3$, $R_4$=H (α-methylene-γ-valerolactone (MVL), same as γ-methyl-α-methylene-γ-butyrolactone),
$R_1$=H, $R_2$=H, $R_3$=H, $R_4$=H (α-methylene-γ-butyrolactone (MBL)),
$R_1$=CH$_3$, $R_2$=H, $R_3$=H, $R_4$=H (β-methyl-α-methylene-γ-butyrolactone (MMBL)), or
$R_1$=H, $R_2$=H, $R_3$=CH$_3$, $R_4$=CH$_3$ (γ,γ-dimethyl-α-methylene-γ-butyrolactone).

More preferably, the lactone is either MVL, MBL or MMBL.

By "(meth)acrylate monomers" it is meant a compound and isomers thereof according to the general formula:

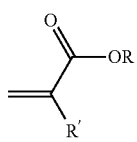

wherein R can be selected from the group consisting of hydrogen and an alkyl containing from 1 to 12 carbon atoms and R' can be selected from the group consisting of hydrogen and methyl. Examples of (meth)acrylate monomers are acrylic acid and salts thereof, methacrylic acid and salts thereof, acrylic anhydride, methacrylic anhydride, methyl acrylate, methyl methacrylate, ethyl acrylate, propyl acrylate, butyl acrylate, butyl methacrylate, propyl methacrylate, lauryl acrylate, 2-ethylhexylacrylate, ethyl methacrylate, isobornyl methacrylate, hydroxyethyl (meth)acrylate, hydroxypropyl (meth)acrylate, polyethylene glycol (meth)acrylate. Preferred (meth)acrylate monomers include methyl acrylate, methyl methacrylate and methacrylic acid.

By vinyl ester monomers it is meant a compound and isomers thereof according to the general formula:

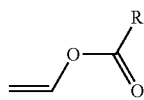

wherein R can be selected from an alkyl containing from 1 to 17 carbon atoms. Preferred vinyl ester monomers are vinyl acetate, vinyl butyrate, vinyl stearate, vinyl laurate, vinyl myristate and vinyl propionate.

By nitrile containing monomers it is meant a compound and isomers thereof according to the general formula:

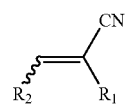

wherein $R_1$ and $R_2$ can be selected, separately from each other, from the group consisting of hydrogen and an alkyl containing from 1 to 17 carbon atoms, or a nitrile group.

Examples of nitrile containing monomers are acrylonitrile (R1=R2=H), methacrylonitrile (R1=CH3, R2=H), fumaronitrile (R1=CH3, R2=CN), crotonitrile (R1=CH3, R2=CH3). Preferred nitrile containing monomers are acrylonitrile and methacrylonitrile.

By (meth)acrylamide monomers it is meant a compound and isomers thereof according to the general formula:

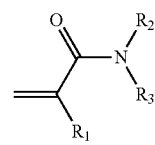

wherein $R_1$, $R_2$ and $R_3$ can be selected, separately from each other, from the group consisting of hydrogen and an alkyl containing from 1 to 17 carbon atoms or hydroxyalkyl.

Preferred (meth)acrylamide monomers are acrylamide ($R_1$=$R_2$=$R_3$=H), methacrylamide ($R_1$=CH$_3$, $R_2$=$R_3$=H), and N-substituted (meth)acrylamide monomers such as N,N-dimethylacrylamide ($R_1$=H, $R_2$=$R_3$=CH$_3$), N,N-dimethylmethacrylamide ($R_1$=$R_2$=$R_3$=CH$_3$), N-methylolacrylamide ($R_1$=H, $R_2$=H, $R_3$=CH$_2$OH).

By N-substituted maleimide monomers it is meant a compound according to the general formula:

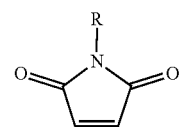

wherein R can be selected from an alkyl containing from 1 to 17 carbon atoms, or halogen atom.

Preferred N-substituted maleimide monomers are those where R is selected from the group consisting of H, CH3, phenyl, cyclohexyl and halogen. It is preferable that R is selected from the group consisting of phenyl and cyclohexyl.

According to the present disclosure, the itaconate diester copolymer contains 0-50 wt. % of vinyl aromatic comonomers, based on the total weight of the comonomers. More preferably, the copolymers contains less than 40 wt. %, even more preferably less than 20 wt. %, most preferably less than 10 wt. % of vinyl aromatic comonomers. In some embodiments it may be preferred that the itaconate diester copolymer contains substantially no vinyl aromatic comonomers. A particular example of vinyl aromatic comonomers is styrene. Without wishing to be bound by theory, it is believed by inventors that the use of styrene as a comonomer, especially in higher amounts, may lead to poor expansion properties of the resulting microspheres. Nevertheless, in some embodiments, it is possible that styrene is present in small amounts as specified above.

In some embodiments, it is preferred that the copolymer contains less than 50 wt. % of the itaconate dialkylester monomer, based on the total weight of the comonomers. Best expansion properties have been observed for the amounts 10-45 wt. %, preferably 20-40 wt. % of the itaconate dialkylester monomer. When a comonomer content in the polymer is discussed within the present specification, it is understood as the content of the comonomer as a building block in the copolymer relative to the total polymer weight, and not as a free monomer content of unreacted monomers that may be present in the polymer reaction product.

In some embodiments, it may be preferred that the copolymer comprises at least one acidic monomer. An acidic monomer in this case comprises both an ethylenically unsaturated bond and a carboxylic group. Examples of acidic monomers are (meth)acrylic acid, itaconic acid, maleic acid, fumaric acid and citraconic acid and their monoesters such as monomethyl itaconate, monoethyl itaconate, monobutyl itaconate. The acidic monomer can be present in amounts up to 70 wt. %, for example in amounts 1-50 wt. %, based on the total polymer weight.

In some embodiments, the ethylenically unsaturated comonomers comprise small amounts of one or more cross-linking multifunctional monomers, such as one or more of divinyl benzene, ethylene glycol di(meth)acrylate, di(ethylene glycol) di(meth)acrylate, triethylene glycol di(meth)acrylate, propylene glycol di(meth)acrylate, 1,4-butanediol di(meth)acrylate, 1,6-hexanediol di(meth)acrylate, glycerol di(meth)acrylate, 1,3-butanediol di(meth)acrylate, neopentyl glycol di(meth)acrylate, 1,10-decanediol di(meth)acrylate, pentaerythritol tri(meth)acrylate, pentaerythritol tetra (meth)acrylate, dipentaerythritol hexa(meth)acrylate, triallylformal tri(meth)acrylate, allyl methacrylate, trimethylolpropane tri(meth)acrylate, tributanediol di(meth)acrylate, PEG #200 di(meth)acrylate, PEG #400 di(meth)acrylate, PEG #600 di(meth)acrylate, 3-acryloyloxyglycol monoacrylate, triacryl formal, triallyl isocyanate, triallyl isocyanurate, 1,4-butanediol divinyl ether and trivinylcyclohexane or any combination thereof. Particularly preferred are crosslinking monomers that are at least tri-functional. The amounts of crosslinking functional monomers may, for example, be from 0.1 to 5 wt. % of the total polymer weight, more preferably 0.1-3 wt. % and even more preferably 0.1-1 wt. %.

The softening temperature of the polymer shell, normally corresponding to its glass transition temperature (Tg), is preferably within the range from 0 to 350° C., most preferably from 50 to 300° C.

The polymer shell surrounds a blowing agent-containing hollow core, i.e. the polymeric shell encapsulates the blowing agent. The blowing agent (propellant) is selected such that it has a sufficiently high vapour pressure at temperatures above the softening temperature of the thermoplastic shell to be able to expand the microparticles. In most cases the boiling temperature of the blowing agent is not higher than the softening temperature of the thermoplastic shell. The boiling point at the atmospheric pressure of the blowing agent is preferably in the range from −50 to 250° C., more preferably from −20 to 200° C., most preferably from −20 to 100° C. The amount of the blowing agent in the expandable microspheres is preferably from 5 to 60 wt. %, more preferably from 10 to 50 wt. %, most preferably from 15 to 40 wt. %, particularly most preferably from 15 to 35 wt. % based on the total weight of the microparticles.

The blowing agent can be a single compound or a mixture of compounds. Preferably, the blowing agent is a hydrocarbon or a mixture of hydrocarbons. More preferably, it is a hydrocarbon with 1 to 18 carbon atoms, even more preferably 3 to 15 carbon atoms, most preferably 4 to 12 carbon atoms, or mixtures thereof. The hydrocarbons can be saturated or unsaturated hydrocarbons. The hydrocarbons can be aliphatic, cyclic or aromatic hydrocarbons. Examples of suitable hydrocarbons include n-butane, isobutane n-pentane, isopentane, cyclopentane, neopentane, hexane, isohexane, neo-hexane, cyclohexane, heptane, isoheptane, octane, isooctane, decane, dodecane, isododecane and any combination thereof. Aside from them, other hydrocarbon types can also be used, such as petroleum ether. It is preferable that the blowing agent contains n-butane, isobutane, n-pentane, isopentane, isohexane, isooctane, isododecane or mixtures thereof.

The temperature at which the expansion starts is called Tstart, while the temperature at which maximum expansion is reached is called Tmax. In some applications it is desirable that the microspheres have a high Tstart and high expansion capability, so as to be used in high temperature applications like foaming of thermoplastic materials in e.g. extrusion or injection molding processes. Tstart for the expandable microspheres is preferably from 60 to 300° C., more preferably from 70 to 250° C. In some embodiments, Tstart can be in the range from 190 to 240° C. In other embodiments, lower Tstart temperatures are preferred, such as from 60 to 190° C. Tmax for the expandable microspheres is preferably from 100 to 350° C., most preferably from 110 to 270° C.

The expandable microspheres preferably have a volume median diameter from 1 to 500 μm, more preferably from 3 to 200 μm, most preferably from 3 to 100 μm.

The term expandable microspheres as used herein refers to expandable microspheres that have not previously been expanded, i.e. unexpanded expandable microspheres.

The thermally expandable microspheres according to the present disclosure have a reduced eco-footprint as they are produced from monomers which are at least partially bio-based. By bio-based it is meant that the monomers are not from a fossil fuel source. Itaconate dialkylesters of formula (1) can be produced from biomass via itaconic acid. Itaconic acid can be produced by fermentation of carbohydrates as described in e.g. U.S. Pat. No. 3,044,941. Also unsaturated lactones mentioned above as comonomers can be produced from biomass via different routes. α-Methylene-γ-butyrolactone (MBL), also known as Tulipalin A, is a naturally occurring substance that can be isolated from tulips. MBL, β-methyl-α-methylene-γ-butyrolactone (MMBL) and γ,γ-dimethyl-α-methylene-γ-butyrolactone can be synthesized from bio-based compounds such as itaconic acid. α-Methylene-γ-valerolactone (MVL) can be derived from biomass via levulinic acid by a method developed by DuPont such as described in US 2006/100447.

The bio-based monomers used in the present disclosure surprisingly impart thermoplastic properties to the thermoplastic shell ensuring that the thermally expandable microspheres expand satisfactorily when heated to form expanded microspheres. The thermoplastic shell comprising the bio-based monomers surprisingly retains the blowing agent therein.

In a further aspect, the present disclosure relates to a process for the manufacture of thermally expandable microspheres as described above. The process comprises aqueous suspension polymerization of ethylenically unsaturated monomers as described above using a free-radical initiator in the presence of a blowing agent, wherein at least one ethylenically unsaturated monomer is the itaconate diester according to formula (1) as described above. Regarding the kinds and amounts of the comonomers and blowing agent, the above description of the expandable microspheres is referred to. The production may follow the same principles as described in U.S. Pat. Nos. 3,615,972, 3,945,956, 4,287,308, 5,536,756, EP 0 486 080, U.S. Pat. No. 6,509,384, WO 2004/072160, WO 2007/091960.

In a typical process of suspension polymerization, the monomers and the blowing agent are mixed together to form a so called oil-phase. The oil-phase is then mixed with an aqueous mixture, for example by stirring, agitation, to form an emulsion. The emulsion formation allows for a manipulation of a size of the resultant emulsion droplets. It is preferable that the emulsion droplets have a mean average diameter of up to 500 µm and preferably in a range of 3-100 µm. The emulsion formation may be performed by devices known in the art to provide emulsion droplets having a mean average diameter within the aforementioned range.

The emulsion may be stabilised with so called stabilising chemicals, or suspending agents, as known in the art such as surfactants, polymers or particles.

The preferred stabilisation system is particle stabilisation by a so-called "Pickering Emulsion" processes. The stabilisation of the emulsion droplets is preferred for a number of reasons; without stabilisation a coalescence of the emulsion droplets containing the monomers and the blowing agents may occur. Coalescence has negative effects; such as, a non-uniform emulsion droplet size distribution resulting in undesirable proportions of emulsion droplets with different sizes, which in turn leads to undesirable properties of thermally expandable microspheres after polymerization. Furthermore, stabilisation prevents aggregation of thermally expandable microspheres. In addition, stabilisation may prevent formation of non-uniform thermally expandable microspheres and/or the formation of a non-uniform thermoplastic shell and an incomplete thermoplastic shell of the thermally expandable microspheres. The suspending agent is preferably present in an amount from 1 to 20 wt. % based on the total weight of the monomer phase, which includes monomer(s) and the blowing agent.

In some embodiments, the suspending agent is selected from the group consisting of salts, oxides and hydroxides of metals like Ca, Mg, Ba, Zn, Ni and Mn, for example one or more of calcium phosphate, calcium carbonate, magnesium hydroxide, magnesium oxide, barium sulphate, calcium oxalate, and hydroxides of zinc, nickel or manganese. These suspending agents are suitably used at a high pH, preferably from 5 to 12, more preferably from 6 to 10, yet more preferably from 7 to 10. Preferably magnesium hydroxide is used.

In other embodiments, it may be advantageous to work at a low pH, preferably from 1 to 7, more preferably from 3 to 5. A suitable suspending agent for this pH range is selected from the group consisting of starch, methyl cellulose, hydroxypropyl methylcellulose, hydroxypropyl methylcellulose, carboxy methylcellulose, gum agar, silica, colloidal clays, oxide and hydroxide of aluminium or iron. Preferably silica is used.

In order to enhance the effect of the suspending agent, it is also possible to add small amounts of one or more co-stabilisers, for example from 0.001 to 1 wt. % based on the total weight of the monomer(s). Co-stabilisers can be organic materials which can be selected, for example, from one or more of water-soluble sulfonated polystyrenes, alginates, carboxymethylcellulose, tetramethyl ammonium hydroxide or chloride or water-soluble complex resinous amine condensation products such as the water-soluble condensation products of diethanolamine and adipic acid, the water-soluble condensation products of ethylene oxide, urea and formaldehyde, polyethylenimine, polyvinylalcohol, polyvinylpyrrolidone, polyvinylamine, amphoteric materials such as proteinaceous, materials like gelatin, glue, casein, albumin, glutin and the like, non-ionic materials like methoxycellulose, ionic materials normally classed as emulsifiers, such as soaps, alkyl sulphates and sulfonates and long chain quaternary ammonium compounds.

In some embodiments, the suspending agent may be silica particles with co-stabilisers. The silica particles with co-stabilisers provide a stabilising protective layer on a surface of the thermoplastic shell of the thermally expandable thermoplastic microspheres and the resultant expanded microspheres. Such a combination of silica particles and co-stabilisers is disclosed in U.S. Pat. No. 3,615,972. The co-stabilisers in this case can be selected from: metal ions (such as Cr(III), Mg(II), Ca(II), Al(III) or Fe(III)); a flocculant (such as a poly-condensate oligomer of adipic acid and diethanol amine) with sometimes a reducing agent. The metal ions interact with the silica particles and the flocculants preventing coalescence of the emulsion droplet and therefore stabilise the emulsion droplets. In other embodiments, the silica particles may be modified with one or more organosilane groups as described in PCT/EP2017/067349.

In a suitable, preferably batch-wise, procedure for preparing microspheres of the present disclosure the polymerization is conducted in a reaction vessel as described below. For 100 parts of the monomer phase, which includes the monomers and the blowing agent, the proportions of which determine proportions of monomer(s) in the polymer shell and the amount of blowing agent in the final product), one or more polymerization initiator, preferably in an amount from 0.1 to 5 parts, aqueous phase, preferably in an amount from 100 to 800 parts, and one or more suspending agent, preferably in an amount from 1 to 20 parts, are mixed and homogenised. The size of the droplets of the monomer phase obtained determines the size of the final expandable microspheres in accordance with the principles described in e.g. U.S. Pat. No. 3,615,972, which can be applied for all similar production methods with various suspending agents. The suitable pH depends on the suspending agent used, as described above.

The emulsion obtained is subjected to conventional radical polymerization using at least one initiator. Typically, the initiator is used in an amount from 0.1 to 5 wt. % based on the weight of the monomer phase. Conventional radical polymerization initiators are selected from one or more of organic peroxides such as dialkyl peroxides, diacyl peroxides, peroxy esters, peroxy dicarbonates, or azo compounds. Suitable initiators include dicetyl peroxydicarbonate, di(4-tert-butylcyclohexyl) peroxydicarbonate, dioctanyl peroxide, dibenzoyl peroxide, dilauroyl peroxide, didecanoyl peroxide, tert-butyl peracetate, tert-butyl perlaurate, tert-butyl perbenzoate, tert-butyl hydroperoxide, cumene hydroperoxide, cumene ethylperoxide, diisopropylhydroxy dicarboxylate, 2,2'-azo-bis(2,4-dimethyl valeronitrile), 2,2'-azobis(2-methylpropionate), 2,2'-azobis[2-methyl-N-(2-hydroxyethyl)propionamide] and the like. It is also possible to initiate the polymerization with radiation, such as high energy ionising radiation, UV radiation in combination with a photoinitiator or microwave-assisted initiation.

When the polymerization is essentially complete, microspheres are normally obtained as an aqueous slurry or dispersion, which can be used as such or dewatered by any conventional means, such as bed filtering, filter pressing, leaf filtering, rotary filtering, belt filtering or centrifuging to obtain a so called wet cake. It is also possible to dry the microspheres by any conventional means, such as spray drying, shelf drying, tunnel drying, rotary drying, drum drying, pneumatic drying, turbo shelf drying, disc drying or fluidised bed drying.

If appropriate, the microspheres may at any stage be treated to reduce the amount of residual unreacted monomers, for example by any of the procedures described in the earlier mentioned WO 2004/072160 or U.S. Pat. No. 4,287,308.

A further aspect of the present disclosure concerns expanded microspheres obtained by expanding expandable microspheres as described above. The expansion typically results in a particle diameter from 2 to 5 times larger than the diameter of the unexpanded microspheres. The density of the expanded microspheres may, for example, be from 0.005 to 0.10 g/cm3. The expansion is effected by heating the expandable microspheres at a temperature above Tstart, preferably at a temperature of at least 90° C. The upper temperature limit is set by when the microspheres start collapsing and depends on the exact composition of the polymer shell and the blowing agent. The ranges for the Tstart and Tmax can be used for finding a suitable expansion temperature. In most cases a temperature in the range 60 to 300° C., or more preferably in the range 70 to 250° C., is suitable. The density of the expanded microspheres can be controlled by selecting temperature and time for the heating. The expansion can be effected by any suitable means for heating in any suitable device, as described in e.g. EP 0 348 372, WO 2004/056549 or WO 2006/009643.

The expandable and expanded microspheres of the present disclosure are useful in various applications such as printing inks (such as waterborne inks, solvent borne inks, plastisols, thermal printer paper, UV-curing inks etc. e.g. for textile, wall paper etc.), putties, sealants, porous ceramics, toy-clays, underbody coatings, adhesives, debonding of adhesives, technological cork, artificial leather, genuine leather, paint, non-woven materials, paper and board, coatings (e.g anti-slip coating etc.) for various materials such as paper, board, plastics, metals and textile, explosives, cable insulations, thermoplastics (such as polyethylene, polyvinyl chloride, poly(ethylene-vinylacetate), polypropylene, polyamides, poly(methyl methacrylate), polycarbonate, acrylonitrile-butadiene-styrene polymer, polylactic acid, polyoxymethylene, polyether ether ketone, polyetherimide, polyether sulfone, polystyrene and polytetrafluoroethylene) or thermoplastic elastomers (such as styrene-ethylene-butylene-styrene copolymer, styrene-butadiene-styrene copolymer, thermoplastic polyurethanes and thermoplastic polyolefins), styrene-butadiene rubber, natural rubber, vulcanized rubber, silicone rubbers, thermosetting polymers (such as epoxies, polyurethanes and polyesters). In some of these applications expanded microspheres are particularly advantageous, such as in putties, sealants, toy-clays, genuine leather, paint, explosives, cable insulations, porous ceramics, and thermosetting polymers (like epoxies, polyurethanes and polyesters). In some cases it is also possible to use a mixture of expanded and expandable microspheres of the present disclosure, for example in underbody coatings, silicone rubbers and light weight foams.

The present disclosure will be further described in connection with the following examples which, however, are not to be interpreted to limit the scope of the present disclosure. If not otherwise stated, all parts and percentages refer to parts and percent by weight.

EXAMPLES

The expansion properties were evaluated on dry particles on a Mettler Toledo TMA/SDTA851e with STARe software using a heating rate of 20° C./min and load (net.) of 0.06 N. Tstart is the temperature at which the expansion starts, Tmax is the temperature at which maximum expansion is obtained and TMA density is the density of the microspheres at Tmax. The lower the TMA density, the better the microspheres expand. The TMA density of 1 g/ml means no expansion.

The particle size and size distribution was determined by laser light scattering on a Malvern Mastersizer Hydro 2000 SM apparatus on wet samples. The mean particle size is presented as the volume median diameter d(0.5).

The amount of the blowing agent was determined by thermal gravimetric analysis (TGA) on a Mettler Toledo TGA/DSC 1 with STARe software. All samples were dried prior to analysis in order to exclude as much moisture as possible and if present also residual monomers. The analyses were performed under an atmosphere of nitrogen using a heating rate at 20° C. min-1 starting at 30° C.

Example 1

A reaction mixture containing Mg(OH)2-stabilised organic droplets in water was created by mixing the phases and stirring vigorously until a suitable droplet size had been achieved. The water dispersion contained 2.4 parts of Mg(OH)2 and about 300 parts of water. The organic droplets contained 0.5 parts of dicetyl peroxydicarbonate, 25 parts of isopentane and 0.5 parts of trimethylolpropane trimethacrylate. Dimethyl itaconate (DMI), acrylonitrile (AN) and methyl acrylate (MA) were added in the amounts as indicated in Table 1 in parts per weight. Polymerization was performed in a sealed reactor under agitation at 57° C. during 5 hours followed by 63° C. during 4 hours. After cooling to room temperature a sample of the obtained microsphere slurry was removed for determination of the particle size distribution. After filtration, washing and drying the particles were analyzed by TMA. The dry particles contained about 20 wt. % of isopentane. The particle size and TMA-results are found in Table 1.

Example 2

A dispersion comprising about 260 parts of water, 30 parts of 50 wt. % surface-modified colloidal silica (Levasil 50/50, surface-modified with 40% propylsilyl/60% glycerolpropylsilyl) was prepared and maintained at a pH of about 4.5. The aqueous dispersion was mixed with an organic phase that contained 2 parts of dilauroyl peroxide, 25 parts of isopentane and 0.5 parts of trimethylolpropane trimethacrylate. Dimethyl itaconate, acrylonitrile and methyl acrylate were added in the amounts as indicated in Table 1. Polymerization was performed at 62° C. in a sealed reactor under agitation during 20 hours. After cooling to room temperature a sample of the obtained microsphere slurry was removed for determination of the particle size distribution. After filtration, washing and drying the particles were analyzed by TMA. The dry particles contained about 16 wt. % of isopentane. The particle size and TMA-results are found in Table 1.

Example 3

Microspheres were prepared as in Example 2 except for monomers, which were added according to Table 1. The dry particles contained about 16 wt. % of isopentane. The particle size and TMA-results are found in Table 1.

Example 4

A reaction mixture containing Mg(OH)2-stabilised organic droplets in water was created by mixing the phases and stirring vigorously until a suitable droplet size had been achieved. The water dispersion contained 3.2 parts of Mg(OH)2 and about 280 parts of water. The organic droplets contained 2 parts of dilauroyl peroxide, 27 parts of isopentane and 0.3 parts of trimethylolpropane trimethacrylate. Dimethyl itaconate, acrylonitrile and methyl acrylate were added in the amounts as indicated in Table 1 in parts per weight. Polymerization was performed at 62° C. in a sealed reactor under agitation during 20 hours. After cooling to room temperature a sample of the obtained microsphere slurry was removed for determination of the particle size distribution. After filtration, washing and drying the particles were analyzed by TMA. The dry particles contained about 21 wt. % of isopentane. The particle size and TMA-results are found in Table 1.

Example 5

Microspheres were prepared as in Example 4 except for monomers, which were added according to Table 1. The dry particles contained about 20 wt. % of isopentane. The particle size and TMA-results are found in Table 1.

Example 6

Microspheres were prepared as in Example 2 except for monomers, which were added according to Table 1. The dry particles contained about 21 wt. % of isopentane. The particle size and TMA-results are found in Table 1.

Example 7

A dispersion comprising about 260 parts of water, 30 parts of 50 wt. % surface-modified colloidal silica (Levasil 50/50, surface-modified with 40% propylsilyl/60% glycerolpropylsilyl) was prepared and maintained at a pH of about 4.5. The aqueous dispersion was mixed with an organic phase that contained 2 parts of dicetyl peroxydicarbonate, 25 parts of isopentane and 0.5 parts of trimethylolpropane trimethacrylate. Dimethyl itaconate and vinylidene chloride were added in the amounts as indicated in Table 1. Polymerization was performed in a sealed reactor under agitation at 57° C. during 5 hours followed by 63° C. during 4 hours. After cooling to room temperature a sample of the obtained microsphere slurry was removed for determination of the particle size distribution. The dry particles contained about 14 wt. % of isopentane. The particle size and expansion results are found in Table 1.

TABLE 1

Copolymers with different amounts of dimethyl itaconate

| Ex | Copolymer | Composition (parts) | Blowing agent | Stab. system | Size (μm) | $T_{start}$ (° C.) | $T_{max}$ (° C.) | TMA density (g/ml) |
|---|---|---|---|---|---|---|---|---|
| 1 | DMI/AN/MA | 10/65/25 | IP | Mg(OH)$_2$ | 19 | 118 | 139 | 0.018 |
| 2 | DMI/AN/MA | 15/61/24 | IP | SiO$_2$ | 19 | 134 | 147 | 0.012 |
| 3 | DMI/AN/MA | 25/54/21 | IP | SiO$_2$ | 22 | 139 | 147 | 0.012 |
| 4 | DMI/AN/MA | 25/50/25 | IP | Mg(OH)$_2$ | 66 | 99 | 142 | 0.017 |
| 5 | DMI/AN/MA | 30/40/30 | IP | Mg(OH)$_2$ | 37 | 92 | 143 | 0.052 |
| 6 | DMI/AN | 40/60 | IP | SiO$_2$ | 24 | 107 | 148 | 0.019 |
| 7 | DMI/VDC | 60/40 | IP | SiO$_2$ | 7 | See comment a) | | | a) Expansion is observed under microscope equipped with a heating stage. At 85° C. a plurality of microspheres expanded about 2 times in diameter.
DMI = dimethyl itaconate,
AN = acrylonitrile,
MA = methyl acrylate,
VDC = vinylidene chloride,
IP = isopentane Examples 8-10

Microspheres were prepared in a plurality of polymerization experiments performed as in Example 4 except for monomers, which were added according to Table 2. The dry particles contained about 21-36 wt. % of isopentane. The particle sizes and TMA-results are found in Table 2.

Example 11

A reaction mixture containing Mg(OH)2-stabilised organic droplets in water was created by mixing the phases and stirring vigorously until a suitable droplet size had been achieved. The water dispersion contained 6.5 parts of Mg(OH)2 and about 220 parts of water. The organic droplets contained 0.5 parts of di(4-tert-butylcyclohexyl) peroxydicarbonate, 34 parts of isopentane and 0.3 parts of trimethylolpropane trimethacrylate. Dimethyl itaconate, acrylonitrile and α-methylene-γ-valerolactone were added in the amounts as indicated in Table 2 in parts per weight. Polymerization was performed in a sealed reactor under agitation at 56° C. during 6 hours followed by 62° C. during 5 hours. After cooling to room temperature a sample of the obtained microsphere slurry was removed for determination of the particle size distribution. After filtration, washing and drying the particles were analyzed by TMA. The dry particles contained about 28 wt. % of isopentane. The particle size and TMA-results are found in Table 2.

Example 12

A dispersion comprising about 260 parts of water, 8.5 parts of 40 wt % colloidal silica (Bindzil 40/220), 60 parts of NaCl and 0.7 parts of a poly-condensate oligomer of adipic acid and diethanol amine was prepared and maintained at a pH of approx. 3.2. The aqueous dispersion was mixed with an organic phase that contained 2 parts of dilauroyl peroxide, 26 parts of isopentane and 0.3 parts of trimethylolpropane trimethacrylate. Dimethyl itaconate, acrylonitrile, methacrylonitrile and methacrylic acid were added in the amounts as indicated in Table 2. 0.06 parts of Fe(NO3)3 was added and the polymerization was performed at 62° C. in a sealed reactor under agitation during 20 hours. After cooling to room temperature a sample of the obtained microsphere slurry was removed for determination of the particle size distribution. After filtration, washing and drying the particles were analyzed by TMA. The dry particles contained about 22 wt. % of isopentane. The particle size and TMA-results are found in Table 2.

Examples 13-14

Microspheres were prepared in a plurality of polymerization experiments performed as in Example 12 except for monomers, which were added according to Table 2. The dry particles of Examples 13-14 contained about 26 wt. % and 18 wt. % of isopentane, respectively. The particle sizes and TMA-results are found in Table 2.

TABLE 2

| Dimethyl itaconate with acrylonitrile and other comonomers | | | | | | | |
|---|---|---|---|---|---|---|---|
| Ex Copolymer | Composition (parts) | Blowing agent | Stab. system | Size ($\mu$m) | $T_{start}$ (° C.) | $T_{max}$ (° C.) | TMA density (g/ml) |
| 8 DMI/AN/MMA | 20/60/20 | IP | Mg(OH)$_2$ | 56 | 108 | 142 | 0.022 |
| 9 DMI/AN/MAN | 20/60/20 | IP | Mg(OH)$_2$ | 41 | 100 | 152 | 0.018 |
| 10 DMI/AN/MAN/MA | 20/45/25/10 | IP | Mg(OH)$_2$ | 53 | 90 | 149 | 0.016 |
| 11 DMI/AN/MVL | 20/60/20 | IP | Mg(OH)$_2$ | 36 | 126 | 149 | 0.011 |
| 12 DMI/AN/MAN/MAA | 20/17/37/26 | IP | SiO$_2$ | 61 | 126 | 212 | 0.025 |
| 13 DMI/AN/MAN/MMA/MAA | 20/17/17/20/26 | IP | SiO$_2$ | 59 | 128 | 199 | 0.011 |
| 14 DMI/MAA/MVL | 25/50/25 | IP | SiO$_2$ | 42 | See comment a) | | | a) Expansion is observed under microscope equipped with a heating stage. A plurality of particles expanded between 210-250° C.

DMI = dimethyl itaconate,

AN = acrylonitrile,

MMA = methyl methacrylate,

MAN = methacrylonitrile,

MVL = $\alpha$-methylene-$\gamma$-valerolactone,

MAA = methacrylic acid,

IP = isopentane

Examples 15-17

Microspheres were prepared in a plurality of polymerization experiments performed as in Example 2 except for monomers, which were added according to Table 3. The dry particles contained about 14-17 wt. % of isopentane. The particle sizes and TMA-results are found in Table 3.

Example 18-20

Microspheres were prepared in a plurality of polymerization experiments performed as in Example 4 except for monomers, which were added according to Table 3, and blowing agents which were added according to Table 3 in the same amounts as in Example 4. The dry particles of Example 18 contained about 19 wt. % of isopentane, and the dry particles of Examples 19-20 contained about 7-12 wt. % of isobutane. The TMA-results and particle sizes are found in Table 3.

Example 21

A dispersion comprising about 270 parts of water, 31 parts of 50 wt. % surface-modified colloidal silica (Levasil 50/50, surface-modified with 40% propylsilyl/60% glycerolpropylsilyl) was prepared and maintained at a pH of about 7. The aqueous dispersion was mixed with an organic phase that contained 2 parts of dilauroyl peroxide, 27 parts of isopentane and 0.3 parts of trimethylolpropane trimethacrylate. Dibutyl itaconate, acrylonitrile and methyl acrylate were added in the amounts as indicated in Table 3. Polymerization was performed at 62° C. in a sealed reactor under agitation during 20 hours. After cooling to room temperature a sample of the obtained microsphere slurry was removed for determination of the particle size distribution. After filtration, washing and drying the particles were analyzed by TMA. The dry particles contained about 11 wt. % of isopentane. The particle size and TMA-results are found in Table 3.

Example 22

A dispersion comprising about 270 parts of water, 22 parts of 50 wt. % surface-modified colloidal silica (Levasil 50/50, surface-modified with 40% propylsilyl/60% glycerolpropylsilyl) was prepared and maintained at a pH of about 4.5. The aqueous dispersion was mixed with an organic phase that contained 1.8 parts of dicetyl peroxydicarbonate, 28 parts of isobutane and 0.5 parts of trimethylolpropane trimethacrylate. Dimetyl itaconate, acrylonitrile and methyl acrylate were added in the amounts as indicated in Table 4. Polymerization was performed in a sealed reactor under agitation at 57° C. during 5 hours followed by 63° C. during 4 hours. Prior to handling the particles outside the reactor, the amount of residual monomers was reduced by treatment with 4 parts NaHSO3 for 4.5 hours at 70° C. After cooling to room temperature a sample of the obtained microsphere slurry was removed for determination of the particle size distribution. After filtration, washing and drying the particles were analyzed. The dry particles contained about 19 wt. % of isobutane. The particle size and TMA-results are found in Table 4.

Example 23

Microspheres were prepared as in Example 22 except for monomers, which were added according to Table 4, and blowing agent which was added according to Table 4 in the same amount as in Example 22. The dry particles of contained about 12 wt. % of n-butane. The TMA-results and particle sizes are found in Table 4.

Example 24

A dispersion comprising about 240 parts of water, 20 parts of 50 wt. % surface-modified colloidal silica (Levasil 50/50, surface-modified with 40% propylsilyl/60% glycerolpropylsilyl) was prepared and maintained at a pH of about 4.5. The aqueous dispersion was mixed with an organic phase that contained 1.8 parts of dicetyl peroxydicarbonate, 19 parts of isobutane and 0.3 parts of trimethylolpropane trimethacrylate. Dimetyl itaconate, vinylidene chloride and methyl acrylate were added in the amounts as indicated in Table 4. Polymerization was performed in a sealed reactor under agitation at 57° C. during 5 hours followed by 63° C. during 4 hours. Prior to handling the particles outside the reactor, the amount of residual monomers was reduced by treatment with 2.2 parts sodium persulfate for 4 hours at 73° C. After cooling to room temperature a sample of the obtained microsphere slurry was removed for determination of the particle size distribution. After filtration, washing and drying the particles were analyzed. The dry particles contained about 3 wt. % of isobutane. The particle size and TMA-results are found in Table 4.

TABLE 3

Copolymers with diethyl itaconate and dibutyl itaconate

| Ex | Copolymer | Composition (parts) | Blowing agent | Stab. system | Size (μm) | $T_{start}$ (° C.) | $T_{max}$ (° C.) | TMA density (g/ml) |
|---|---|---|---|---|---|---|---|---|
| 15 | DEI/AN/MA | 15/61/24 | IP | $SiO_2$ | 17 | 97 | 146 | 0.031 |
| 16 | DEI/AN/MMA | 20/60/20 | IP | $SiO_2$ | 16 | 123 | 151 | 0.019 |
| 17 | DEI/AN/MA | 20/60/20 | IP | $SiO_2$ | 18 | 99 | 148 | 0.016 |
| 18 | DEI/AN/MA | 20/60/20 | IP | $Mg(OH)_2$ | 23 | 101 | 129 | 0.032 |
| 19 | DEI/AN/MA | 20/60/20 | IB | $Mg(OH)_2$ | 60 | 98 | 169 | 0.033 |
| 20 | DBI/AN/MA | 20/60/20 | IB | $Mg(OH)_2$ | 58 | 93 | 135 | 0.13 |
| 21 | DBI/AN/MA | 20/60/20 | IP | $SiO_2$ | 44 | 125 | 180 | 0.035 |

DEI = diethyl itaconate,
AN = acrylonitrile,
MA = methyl acrylate,
MMA = methyl methacrylate,
DBI = dibutyl itaconate,
IP = isopentane,
IB = isobutane

TABLE 4

Dimethyl itaconate copolymers with n-butane or isobutane as propellants

| Ex | Copolymer | Composition (parts) | Blowing agent | Stab. system | Size (μm) | $T_{start}$ (° C.) | $T_{max}$ (° C.) | TMA density (g/ml) |
|---|---|---|---|---|---|---|---|---|
| 22 | DMI/AN/MA | 30/51/19 | IB | SiO$_2$ | 15 | 93 | 124 | 0.013 |
| 23 | DMI/AN/MA | 20/58/22 | NB | SiO$_2$ | 12 | 94 | 129 | 0.013 |
| 24 | DMI/VDC/MA | 20/60/20 | IB | SiO$_2$ | 17 | 68 | 101 | 0.043 |

DMI = dimethyl itaconate,
AN = acrylonitrile,
MA = methyl acrylate,
VDC = vinylidene chloride,
IB = isobutane,
NB = n-butane

Examples 25 to 27 (Comparative)

An aqueous phase was prepared, using 22.3 parts water, 2.79 (±0.02) parts of modified colloidal silica (of Example 2), 0.89 parts 1M aqueous NaOH and 1.42 parts 10 wt % aqueous acetic acid, to which 0.54 parts of 35 wt % dicetyl peroxydicarbonate solution was added. Separately, an organic phase was prepared of 9.48 parts monomer (acrylonitrile (AN), methyl acrylate (MA) and dimethyl maleate (DMM) in the relative amounts listed in Table 5), together with 2.4 parts isopentane and 0.05 parts of trimethylolpropane trimethacrylate. The phases were mixed together and stirred to ensure homogenisation. Polymerisation was conducted in a sealed vessel at 57° C. for 5 hours, followed by 63° C. for 4 hours under constant agitation, before cooling to room temperature. The solids were then filtered and dried.

Results are shown in Table 5. The dry particles contained variable amounts of volatile material (primarily blowing agent), with values of 4.1, 24.4 and 13.0 wt % for Examples 25-27 respectively.

Examples 28 to 30 (Comparative)

The procedure of Example 25 was performed, wherein the aqueous phase comprised 22.3 parts water, 2.83 (±0.01) parts of the modified colloidal silica (of Example 2), 0.89 parts 1M aqueous NaOH, 1.42 parts 10 wt % aqueous acetic acid, and 0.54 parts of 35 wt % dicetyl peroxydicarbonate solution, and the organic phase contained 9.48 parts in total acrylonitrile (AN), methyl acrylate (MA) and diethyl maleate (DEM) monomers in the relative amounts listed in Table 5, together with 2.4 parts isopentane and 0.05 parts of trimethylolpropane trimethacrylate. In addition, for these examples, polymerisation was carried out at 62° C. for 20 hours. Results are shown in Table 5. The dry particles contained variable amounts of volatile material (primarily blowing agent), with values of 13.7, 16.5 and 7.4 wt % for Examples 28-30 respectively.

The results for these comparative experiments demonstrate that systems using dialkyl esters other than itaconate dialkyl esters do not necessarily result in the required microsphere properties, for example by providing lower microsphere yields and/or inferior quality expandable microspheres, such that thermal treatment does not result in the required low densities.

TABLE 5

Comparative copolymers

| Ex | Copolymer | Monomer (wt % of total monomer) | Blowing agent | Stab. system | Size (μm) | $T_{start}$ (° C.) | $T_{max}$ (° C.) | TMA density (g/ml) |
|---|---|---|---|---|---|---|---|---|
| 25 | AN/MA/DMM | 54/21/25 | IP | SiO$_2$ | 17.1 | 27.3 | 37.4 | >1 |
| 26 | AN/MA/DMM | 43/17/40 | IP | SiO$_2$ | 16.8 | 26.3 | 41.6 | >1 |
| 27 | AN/MA/DMM | 29/11/60 | IP | SiO$_2$ | 14.1 | 20 | 44.5 | >1 |
| 28 | AN/MA/DEM | 54/21/25 | IP | SiO$_2$ | 15.9 | 27.2 | 32.3 | >1 |
| 29 | AN/MA/DEM | 43/17/40 | IP | SiO$_2$ | 13.2 | 27.1 | 31.0 | >1 |
| 30 | AN/MA/DEM | 29/11/60 | IP | SiO$_2$ | 8.7 | 23.1 | 44.2 | >1 |

AN = acrylonitrile,
MA = methyl acrylate,
DMM = dimethyl maleate,
DEM = diethyl maleate,
IP = isopentane While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. Thermally expandable microspheres comprising a thermoplastic polymer shell encapsulating a blowing agent, wherein the thermoplastic polymer shell comprises a copolymer of an itaconate dialkylester and at least one aliphatic or aromatic mono-ethylenically unsaturated comonomer, wherein the itaconate dialkylester is according to formula (1):

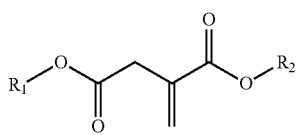

wherein each of $R_1$ and $R_2$, separately from one another, is an alkyl group having from 1 to 4 carbon atoms, and wherein the copolymer includes from 0 to 50 wt. % of vinyl aromatic comonomers, based on the total weight of the comonomers.

2. The microspheres according to claim 1, wherein the itaconate dialkylester is selected from dimethyl itaconate (DMI), diethyl itaconate (DEI), di(n-propyl) itaconate, diisopropyl itaconate, and dibutyl itaconate (DBI).

3. The microspheres according to claim 1, wherein the copolymer includes less than 50 wt. % of the itaconate dialkylester monomer, based on the total weight of the comonomers.

4. The microspheres according to claim 1, wherein the copolymer includes less than 10 wt. % of the vinyl aromatic comonomers.

5. The microspheres according to claim 1, wherein the at least one aliphatic or aromatic mono-ethylenically unsaturated comonomer is selected from unsaturated lactones, acrylonitrile, methacrylonitrile, methyl methacrylate, vinylidene chloride, methyl acrylate, (meth)acrylic acid and (meth)acrylamide.

6. The microspheres according to claim 5, wherein the unsaturated lactone is selected from α-methylene-γ-valerolactone (MVL), β-methyl-α-methylene-γ-butyrolactone (MMBL), and α-methylene-γ-butyrolactone (MBL).

7. The microspheres according to claim 1, wherein the blowing agent is a hydrocarbon.

8. A process for the manufacture of the thermally expandable microspheres of claim 1, comprising the step of polymerizing ethylenically unsaturated monomer(s) by aqueous suspension polymerization using a free-radical initiator in the presence of a blowing agent, wherein at least one ethylenically unsaturated monomer is the itaconate dialkylester according to the formula (1).

9. The process according to claim 8, further comprising the step of stabilizing the suspension with $SiO_2$, optionally modified with one or more organosilane groups, or $Mg(OH)_2$.

10. Expanded microspheres obtained by thermal expansion of the microspheres according to claim 1.

11. A process for the manufacture of expanded microspheres, comprising heating the thermally expandable microspheres according to claim 1 such that the thermally expandable microspheres expand.

12. The microspheres according to claim 1, wherein the copolymer is free of the vinyl aromatic comonomers.

13. The microspheres according to claim 7, wherein the hydrocarbon is selected from n-butane, isobutane n-pentane, isopentane, cyclopentane, neopentane, hexane, isohexane, neo-hexane, cyclohexane, heptane, isoheptane, octane, isooctane, decane, dodecane, isododecane, and any combination thereof.

* * * * *